(12) United States Patent
Minami et al.

(10) Patent No.: US 6,426,372 B1
(45) Date of Patent: Jul. 30, 2002

(54) METHOD OF PRODUCING POROUS CALCINED POLYIMIDE

(75) Inventors: Kazuhiko Minami, Sagamihara-Kanagawa; Mitsuaki Kobayashi, Tokyo, both of (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/555,223

(22) PCT Filed: Jul. 16, 1999

(86) PCT No.: PCT/US99/16118
§ 371 (c)(1),
(2), (4) Date: Jun. 20, 2001

(87) PCT Pub. No.: WO00/05297
PCT Pub. Date: Feb. 3, 2000

(30) Foreign Application Priority Data

Jul. 22, 1998 (JP) .......................................... 10-206310

(51) Int. Cl.$^7$ ................................ C08J 9/26; C08J 9/28
(52) U.S. Cl. .............................. 521/63; 521/61; 521/64
(58) Field of Search ............................. 521/77, 63, 61, 521/64

(56) References Cited

U.S. PATENT DOCUMENTS

| | | | |
|---|---|---|---|
| 3,883,452 A | 5/1975 | Scheuerlein et al. |
| 3,917,761 A | 11/1975 | Scheuerlein et al. |
| 4,940,733 A | 7/1990 | Kuphal et al. |
| 5,108,607 A | 4/1992 | Kraus et al. |
| 5,135,959 A | 8/1992 | Hill |
| 5,750,641 A | 5/1998 | Ezzell et al. |
| 5,776,990 A | 7/1998 | Hedrick et al. |

FOREIGN PATENT DOCUMENTS

| | | |
|---|---|---|
| EP | 0 373402 | 6/1990 |
| JP | 63-278943 | 11/1988 |
| JP | 4-33394 | 2/1992 |
| JP | 4-328126 | 11/1992 |
| JP | 5-182518 | 7/1993 |
| JP | 2-531906 | 9/1996 |

*Primary Examiner*—Morton Foelak
(74) *Attorney, Agent, or Firm*—Philip Y. Dahl

(57) ABSTRACT

Object: to provide a porous polyimide whose dielectric constant and refractive index are lowered while maintaining intrinsic performances of a polyimide, such as heat resistance, etc., and which is highly transparent. Means for solving: a porous polyimide comprising a polyimide containing matrix, and a plurality of micropores dispersed in said matrix, characterized in that said micropores are formed by removing a hydrophilic polymer from a precursor comprising a polyimide-containing matrix, and the hydrophilic polymer dispersed in said matrix, and that the porous polyimide has light transmittance of no less than 70%.

20 Claims, No Drawings

METHOD OF PRODUCING POROUS CALCINED POLYIMIDE

TECHNICAL FIELD OF THE INVENTION

The present invention relates a porous polyimide, which is a polyimide used as a molded article such as film, etc. and has a plurality of micropores which is uniformly present from the inside through the surface of the molded article. It is possible to effectively control physical properties such as dielectric constant, refractive index. etc. of the polyimide by introducing such a porous structure. A film of such a polyimide can be used, for example, as an interlayer insulation film for a semiconductor element such as ULSI (Ulira LSI), etc.

PRIOR ART

As the interlayer insulation film of the semiconductor element, use of a polyimide film has hitherto been studied. Because the polyimide sufficiently satisfies required characteristics for the above interlayer insulation film, that is heat resistance, mechanical strength. solvent resistance, etc. However, when using the polyimide film as the above interlayer insulation film, it was also necessary to reduce the dielectric constant of the polyimide.

As a means for reducing the dielectric constant of the polyimide, for example, a method of introducing a fluorine atom or an alkyl group into a polyimide molecule as a substituent, or a method of incorporating a fluororesin filler by dispersing it into a polyimide matrix has been made. The method of introducing the substituent into the polyimide molecule is disclosed, for example, in Unexamined Patent Publication (Kokai) No. 4-328126. The method using the fluororesin filler is disclosed, for example, in Unexamined Patent Publication (Kokai) No. 4-33394. However, when the above substituent is introduced into the polyimide molecule or the fluororesin filler is incorporated. introduction of a comparatively large amount of the substituent or the filler content was required so as to effectively reduce the dielectric constant. Introduction of a large amount of the substituent or increase in content of the fluororesin filler tends to deteriorate the heat resistance of the polyimide. That is, according to such a method, it is necessary to largely change the structure of the polyimide molecule or composition of the polyimide matrix so as to reduce the dielectric constant. Therefore, intrinsic performances of the polyimide were liable to be deteriorated.

On the other hand, as another method, a method of producing a porous article, which comprises containing hollow microspheres or microporous acrogels by dispersing in a polyimide matrix and thereby previously introducing pores in an uncalcined precursor has also been studied. Such a method is disclosed, for example, in Unexamined Patent Publication (Kokai) No. 5-182518. According to such a method, since it is not necessary to largely change the structure of the polyimide molecule or composition of the polyimide matrix. intrinsic performances of the polyimide are not liable to be deteriorated.

Furthermore, Japanese Patent No. 2531906 corresponding to U.S. Pat. No. 5,776,990 discloses a foamed polyimide film obtained by forming a block copolymer of (a) a polyimide and (b) a thermally decomposable polymer, which is thermally decomposed at the temperature lower than a decomposition temperature of the polyimide, and then heating a film of the block copolymer to decompose the above thermally decomposable polymer. As the thermally decomposable polymer, polypropylene oxide and polymethyl methacrylate are disclosed and the polymer film contains pores having a diameter of less than 1000 angstroms (100 nm). According to such a method, since it is not necessary to largely change the structure of the polyimide molecule or composition of the polyimide matrix, intrinsic performances of the polyimide are not liable to be deteriorated.

As other alternative methods, a method for manufacturing a porous polyimide by forming a precursor comprising a blowing agent dispersed in a polyimide matrix, and heating the precursor to expand and foam it (disclosed in European Patent Publication No. 0373402), a method for manufacturing a porous polyimide by forming a precursor comprising a polyimide matrix and an organic polymer dispersed in said matrix, and decomposing and removing the organic polymer (disclosed in U.S. Pat. Nos. 3,883,452, 4,940,733 and 5,135, 959, and Japanese Unexamined Patent Publication (Kokai) No. 63-278943) are known. As the above organic polymers, formaldehyde homopolymer, polypropylene carbonate), polyurethane, melamine, polyvinyl alcohol, polyacetal and polymethyl methacrylate, etc. are used. In the latter method in which an organic polymer is decomposed, a dispersion of one component (for example, an organic polymer) finely dispersed in the solution comprising the other component (for example, a polyimide) is prepared, and then the dispersion: is dried to form a dispersion-type precursor consisting of said one component dispersed in the matrix comprising the other component. According to these methods since it is not necessary to largely change the structure of the polyimide molecule or composition of the structure of the polyimide matrix, intrinsic performances of the polyimide are not liable to be deteriorated.

PROBLEMS TO BE SOLVED BY THE INVENTION

However, according to the method of previously introducing pores in the uncalcined precursor, the pores were apt to be broken during the calcination and it was difficult to form micropores (e.g. diameter of pores is within the range from 1 to 700 nm). Further, according to a method using a blowing agent or using a dispersion-type precursor, it was also difficult to form relatively fine pores. In these methods, relatively large size pores (for example, diameter of the pores is no less than 1 micrometer) was apt to be formed, and therefore, it was not possible to use the resulting polyimide as an optical material.

According to the method of forming the block copolymer of the polyamide and thermally decomposable polymer, although it was easy to form relatively fine pores, the synthesis reaction of the block copolymer was comparatively difficult, and thus it was disadvantageous to enhance the productivity.

Accordingly, an object of the present invention is to provide a porous polyimide, which can effectively reduce the dielectric constant (e.g. 2.7 or less) and refractive index of the polyimide while preventing deterioration of intrinsic performances (e.g. heat resistance, etc.) of the polyimide by uniformly introducing micropores having a comparatively small size (e.a. diameter of pores is within the range from 1 to 700 nm) from the inside through the surface, and which can be easily formed (produced), which is advantageous to enhance the productivity, and which is highly transparent.

MEANS FOR SOLVING THE PROBLEM:

The present invention has been accomplished to solve the above problems, and provides a porous polyimide comprising polyimide-containing a matrix, and a plurality of micropores dispersed in said matrix, characterized in that said micropores are formed by removing a hydrophilic polymer from a precursor comprising a polyimide-containing matrix and the hydrophilic polymer dispersed in said matrix.

MODE FOR CARRYING OUT THE INVENTION
OPERATION

The porous polyimide of the present invention is formed by removing a hydrophilic polymer from a precursor comprising a polyimide-containing matrix, and the hydrophilic polymer dispersed in the matrix. and it contains a plurality of micropores formed uniformly from the trace of the above removed hydrophilic polymer. Accordingly, pores having a very small size (diameter is normally within the range from 1 to 700 nm) are uniformly present from the inside through the surface, and the porous polyimide has the effectively controlled dielectric constant. According to the present invention, the dielectric constant can be controlled typically to 2.7 or less, suitably to 2.6 or less, particularly 1.9 to 2.5.

The main reason why the dielectric constant is lowered is that an air (pore) having a dielectric constant lower than that of the polyimide is introduced in the matrix. Since the air has a refractive index lower than that of the polyimide. the refractive index is also lowered due to the same reason. In case that the above micropores are uniformly present from the inside through the surface, the dielectric constant is lowered and, at the same time, the surface roughness of the porous polyimide is increased. In this case, the surface roughness (Ra: centerline average roughness, which can be measured by AFM (Interatomic Force Microscope)) is normally not less than 0.35 nm.

The above porous polyimide is suitably formed by the following method. (a) First. a stock solution containing a solvent and an uncalcined polyimide and a hydrophilic polymer dissolved in the solvent is prepared; (b) a precursor is formed by drying the stock solution; and (c) the precursor is calcined, wherein said micropores are introduced into said matrix by removing said hydrophilic polymer by means of decomposition thereof during the step (c).

It is preferred that a hydrophilic polymer is dissolved in a stock solution of a polyimide, and then the polyimide and the hydrophilic polymer are phase separated. as a method to disperse the hydrophilic polymer in the polyimide matrix so that the porous polyimide does not lose a light-transmittance after calcination of the polyimide. According to this method, it is possible to controllably make the size of pores formed from a trace of the removed hydrophilic polymer small (for example, diameter of the pores is 1 to 700 nm). A light transmittance of the resulting polyimide will be no less than 70%. Here, when used as an optical film, a light transmittance of the polyimide is preferably no less than 80%, and particularly no less than 90%. To effectively enhance a light transmittance of the porous polyimide, a polyalkylene glycol is preferred for the hydrophilic polymer. because it is easy to prepare a stock solution of a polyalkylene glycol homogeneously dissolved in the polyimide solution, and the polyimide and a polyalkylene glycol as the hydrophilic polymer are phase separated easily by drying the stock solution. Polyethylene glycol will be particularly preferred. Polyethylene glycol is easily decomposed to gasificate during the calcination of the polyimide precursor, and thus a porous polyimide can be formed which comprises micropores consisting of a trace of the removed polyethylene glycol and having closed pore structure (i.e., not-continuous). The pores are homogeneously present from the inside through the surface of the polyimide and thus, a light transmittance of the polyimide can be effectively enhanced. The term "a light transmittance" as used herein. is defined as a light transmittance measured by a spectrophotometer, using a light having a wave length of 550 nm for a porous polyimide film having a film thickness of 2.5 $\mu$m.

The reason why the hydrophilic polymer is used is that when a stock solution in which the polyimide and the hydrophilic polymer are dissolved is dried, the hydrophilic polymer is phase separated from the matrix comprising the polyimide, and thus a fine dispersion phase comprising the hydrophilic polymer is easily formed.

Therefore, according to the method of the present invention, a uniform porous structure containing micropores of a trace of the removed hydrophilic polymers, which are fine and uniformly dispersed, can be easily formed. Besides, since comparatively difficult synthesis reaction of a polyimide copolymer is not included in the production process, formation (production) can be easily performed and it is advantageous to enhance the productivity.

According to the method of producing the porous polyimide of the present invention, since it is not necessary to largely change the polyimide molecular structure and polyimide matrix composition, the dielectric constant etc. can be effectively reduced without deteriorating intrinsic performances (e.g. heat resistance, etc.) of the polyimide matrix, like the case of the above prior arts.

POLYIMIDE

The polyimide is a material for forming a polyimide matrix, which contains micropores dispersed therein, after calcination of a precursor therefore described hereinafter. As the polyimide, a soluble polyimide having good solubility in an organic solvent is normally used. Suitable polyimide includes, for example, (a) those formed by drying a liquid containing an organic solvent and an soluble polyimide dissolved in the organic solvent, followed by calcination, or (b) a cured article formed from a liquid containing a thermosetting polyimide resin.

The thermosetting polyimide resin also includes those, which are generally referred to as a "thermal polymerization type polyimide resin." In any case described above, the calcination temperature of the polyimide is decided appropriately according to the kind of the polyimide, and the calcination is normally performed at the temperature recommended by a company from which the polyimide is supplied. For example, it is within the range from 80 to 400° C.

Specific examples of the polyimide include soluble polyimide having a tetraphenylthiophene skeleton, cyclobutane-tetracarboxylic dianhydride/aromatic diamine polyimide, deposition polymerized polyimide, aromatic tetracarboxylic dianhydride/aromatic diamine/silicone diamine polyimide, aromatic tetracarboxylic acid dianhydride/aliphatic diamine polyimide, fluorine-containing polyimide, longchain aromatic diamine derived total aromatic polyimide, organic electrolyte addition polyimide, silylated polyimide, polyimide formed by polymerizing (curing) a precursor containing polyamic acid, etc. In order to use as an optical material such as clad of an optical fiber, etc., those having transparency are preferred.

As a solvent of the polyimide, a polar solvent (e.g. 1,2-dichloroethane, N-methylpyrrolidone, $\gamma$-butyrolactone, methyl ethyl ketone, dimethyl acetamide, etc.) is preferred. For example, when the hydrophilic polymer is polyethylene glycol, a chlorine-containing solvent such as 1,2- dichloroethane, etc. is preferred. These solvents may be used alone or in combination thereof.

The concentration of the polyimide in the solution containing the uncalcined polyimide is normally from 1 to 20% by weight.

HYDROPHILIC POLYMER

The hydrophilic polymer may be anyone which can be dissolved in the above polyimide solution, which can be phase separated from the matrix containing the polyimide. after drying the stock solution comprising the polyimide and the hydrophilic polymer. and which can be removed during the calcination. Examples thereof include polyalkylene glycol such as polyethylene glycol. As far as the effects of the present invention is not detrimentally affected, an organic polymer such as polymethyl methacrylate which has comparatively low solubility with the polyimide and can be easily burned out (decomposed, removed) by means of a calcination operation of the polyimide can also be used in combination with the hydrophilic polymer. The organic polymer can also be removed by means of solvent extraction. As the extraction solvent, there can be selected those, which do not dissolve water, alcohol and polyimide, but dissolve the organic polymer. The extraction operation can be performed before and/after calcination.

The molecular weight (number-average molecular weight) of the hydrophilic polymer is normally from 200 to 4,000,000, suitably from 7,000 to 30,000. When the molecular weigh is too small, the hydrophilic polymer has high solubility in the matrix comprising the polyimide and it becomes difficult to phase separate the hydrophilic polymer from the matrix. On the other hand, when the molecular weight is too large, it becomes difficult to remove the hydrophilic polymer. That is, the hydrophilic polymer is remained in the polyimide matrix after calcination and it takes a long time to remove it. The larger the molecular weight, the larger the size of the micropores.

The content of the hydrophilic polymer is normally from 0.1 to 10 g, suitably from 0.3 to 2 g, based on 100 g of the above polyimide solution. When the content is too large, the mechanical strength or transparency of the polyimide after calcination is liable to be lowered. On the other hand, when the content is too small. it is liable to become difficult to reduce the dielectric constant.

FORMATION OF POROUS POLYIMIDE

A polyimide solution, and a stock solution containing the dissolved polyimide and hydrophilic polymer can be prepared by using a normal mixing/dispersing device. Examples thereof include a propeller mixer, a high-speed mixer, a homogenizer, a sand mill, etc.

Then, the above stock solution is coated on a substrate and the stock solution is dried to form a film of a polyimide precursor. In case of the coating, there can be used a normal coating means. for example, spin coating, die coating, bar coating, etc. The drying temperature is decided appropriately according to a boiling point or an evaporation rate of the solvent. The drying temperature is less than calcination temperature of the polyimide. As the substrate, for example. there can be used heatresistant polymer film, glass, metal, silicon wafer, etc.

Finally, the film of the polyimide precursor is calcined and, at the same time., the hydrophilic polymer is removed by decomposition, thereby obtaining a porous polyimide of the present invention. In this case, the calcination temperature is normally within the range from 250 to 400° C. The calcination time varies depending on the calcination temperature, but is normally from 10 minutes to 10 hours. When the calcination operation is performed under an inert atmosphere such as nitrogen, argon, etc., the dielectric constant can be lowered, more effectively.

As far as the effect of the present invention is not adversely affected, the polyimide film can be formed so that the film is composed of a plurality of layers. It is also possible to contain additives such as ultraviolet absorbers, humectants, colorants, inorganic fillers, fluorescent materials, phosphorescent materials, etc. as far as the effect of the present invention is not adversely affected.

EXAMPLES

Example 1

First, a soluble polyimide having transparency, which is disclosed in U.S. Pat. No. 5,750,641, was dissolved in 1,2-dichloroethane to prepare a polyimide solution having a concentration of 10% by weight. This polyimide was a fluorine-containing polyimide having an average molecular weight of about 60,000 and Tg of 360° C., obtained by polymerizing ortho-toluidine(bisanilino)fluorene, 2.2-bis(3, 4-dicarboxyphenyl)-hexafluoropropane dianhydride and 2,5-dimethyl (p-phenylencdiamine) as a starting materials.

To 20 g of this solution, 200 mg of polyethylene glycol having a molecular weight of 7,500 (manufactured by Wako Junyaku Kogyo Co., Ltd.) was added and the mixture was sufficiently stirred to uniformly dissolving polyethylene glycol in the solution, thereby preparing a stock solution. Then, this stock solution was coated on a glass substrate having a thickness of 0.7 mm, on which an aluminum electrode as a film was previously formed, by means of spin coating, followed by drying to form a film of a precursor of a porous polyimide. A film thickness of this precursor was about 2.5 $\mu$m.

Finally, the film of the above precursor was calcined in a nitrogen atmosphere at 360° C. for 30 minutes to burn out polyethylene glycol, thereby obtaining a film of a porous polyimide of this example. A thickness of the film was 2.5 $\mu$m.

An aluminum electrode as a film was further formed on the resulting porous polyimide film. Then, a capacitance of the polyimide film was determined at a frequency of 1 MHz and a dielectric constant was calculated. As a result, it was 2.3.

Furthermore, the surface of the porous polyimide film was observed by AFM (Interatomic Force Microscope). As a result, a structure having a roughness of an order of nanometer (Ra (centerline average roughness)=0.40 nm) was observed. Consequently, it was confirmed that a plurality of micropores was introduced into the polyimide film.

Further, the cross-section of the polyimide film was observed by a transmission electron microscope. A plurality of micropores of an approximately elliptic shape having a longitudinal length of 100 to 300 nm were observed. These pores are closed and non-continuous pores.

Further, a light transmittance of the porous polyimide film of this example was measured by a spectrophotometer (product no. U-4000, manufactured by Hitachi K. K.) (wavelength: 550 nm). The light transmittance was 91%.

Example 2

In the same manner as that described in Example 1 except for changing the number-average molecular weight of polyethylene alycol to 20,000, a porous polyimide of this example was obtained. The dielectric constant of the resulting porous polyimide was measured in the same manner as that described in Example 1 As a result, it was 2.3. Furthermore, the surface of the porous polyimide film of this example was observed by AFM. As a result, a structure having a roughness of an order of nanometer (Ra (centerline average roughness)=1.00 nm) was observed. Consequently, it was confirmed that a plurality of micropores was introduced into the polyimide film.

Further, the cross-section of the polyimide was observed by a transmission electron microscope. A plurality of micropores of an approximately elliptic shape having a longitudinal length of 100 to 500 nm were observed.

Further, a light transmittance of the porous polyimide film of this example was measured by a spectrophotometer (product no. U-4000, manufactured by Hitachi K. K.) (wavelength: 550 nm). The light transmittance was 90%.

COMPARATIVE EXAMPLE

In the same manner as that described in Example 1 except for using no polyethylene glycol, a polyimide of this example was obtained. The dielectric constant of the resulting polyimide was measured in the same manner as that described in Example 1. As a result, it was 2.8. Furthermore, the surface of the polyimide film of this example was observed by AFM. As a result, a structure having a roughness of an order of nanometer (Ra (centerline average roughness)=0.32 nm) was not observed.

Further the cross-section of the polyimide film was observed by a transmission electron microscope. No pores were observed.

Further, a light transmittance of the polyimide of this example was observed by a spectrophotometer (product no. U-4000, manufactured by Hitachi K. K.) (wavelength: 550 nm). The light transmittance was 92%.

EVALUATION OF HEAT RESISTANCE

On the other hand, the heat resistance of the polyimide films of Examples 1 and 2 and that of Comparative Example were evaluated as follows. Each of the resulting polyimide films (after calcination) was heated in a nitrogen atmosphere at 400° C. and cooled to room temperature. Then, the dielectric constant was measured and a change in dielectric constant before and after heating was examined. The polyimide film after heating was allowed to stand in the air for one week, and then a change in dielectric constant was examined in the same manner. It has already been found that the dielectric constant hardly changes under these test conditions in case of a normal polyimide (like non-porous polyimide of comparative example).

As a result, regarding the porous polyimide films of Examples 1 and 2 as well as the polyimide film of Comparative Example. the dielectric constant hardly changed before and after heating and standing in the air. That is, it was confirmed that the formed porous polyimide film can maintain intrinsic heat resistance of the polyimide according to the method of the present invention.

EFFECT OF THE INVENTION

The porous polyimide of the present invention can effectively reduce the dielectric constant and refractive index while maintaining intrinsic performances of the polyimide, such as heat resistance, etc, and is highly transparent.

What is claimed is:

1. A porous polyimide comprising a polyimide-containing matrix, and a plurality of micropores dispersed in said matrix, characterized in that said micropores are formed by removing a hydrophilic polymer from a precursor comprising a polyimide-containing matrix, and the hydrophilic polymer dispersed in said matrix, that the porous polyimide has a light transmittance of no less than 70% when measured by a spectrophotometer using a light having a wave length of 550 nm for a porous polyimide film having a film thickness of 2.5 $\mu$m, and that the pore diameter is $\Lambda$ to 700 nm, wherein the hydrophilic polymer is a polymer which is phase separated from a matrix comprising a polyimide, when a stock solution in which the polyimide and the hydrophilic polymer are dissolved is dried.

2. A precursor for forming a porous polyimide comprising a polyimide-containing matrix, and a plurality of micropores with a pore diameter of 1 to 700 nm dispersed in said matrix after calcination, the precursor comprising a polyimide-containing matrix and a hydrophilic polymer dispersed in said matrix, characterized in that the precursor is formed by drying a stock solution consisting of a dissolved uncalcined polyimide and a hydrophilic polymer wherein the hydrophilic polymer is a polymer which is phase separated from a matrix comprising a polyimide, when a stock solution in which the polyimide and the hydrophilic polymer are dissolved is dried.

3. A method of producing a porous polyimide comprising a polyimide-containing matrix, and a plurality of micropores with a pore diameter of 1 to 700 nm dispersed in said matrix, which comprises the steps of:

(a) preparing a stock solution, containing a solvent, and an uncalcined polyimide and a hydrophilic polymer dissolved in said solvent;

(b) drying said stock to form a precursor; and (c) calcining said precursor; wherein said micropores are introduced into said matrix by removing said hydrophilic polymer by means of decomposition thereof during the step (c);

wherein the hydrophilic polymer is a polymer which is phase separated from a matrix comprising a polyimide, when a stock solution in which the polyimide and the hydrophilic polymer are dissolved is dried.

4. A method of producing a porous polyimide including a plurality of micropores with a pore diameter of 1 to 700 nm, comprising the steps of:

a) providing a solution comprising a solvent, a polyimide polymer and a hydrophilic polymer;

b) drying said solution to form a precursor wherein the hydrophilic polymer is phase separated from the polyimide polymer; and c) heating said precursor to a temperature sufficient to remove the hydrophilic polymer by decomposition of the hydrophilic polymer.

5. The method according to claim 4 wherein said solution comprises 1–20% by weight of said polyimide polymer and 0.1–10% by weight of said hydrophilic polymer.

6. The method according to claim 5 wherein said solution comprises 0.3–2% by weight of said hydrophilic polymer.

7. The method according to claim 4 wherein said step of drying said solution to form a precursor comprises coating said solution.

8. The method according to claim 4 wherein said hydrophilic polymer is a polyalkylene glycol.

9. The method according to claim 4 wherein said hydrophilic polymer is polyethylene glycol.

10. The method according to claim 5 wherein said hydrophilic polymer is a polyalkylene glycol.

11. The method according to claim 5 wherein said hydrophilic polymer is polyethylene glycol.

12. The method according to claim 6 wherein said hydrophilic polymer is a polyalkylene glycol.

13. The method according to claim 6 wherein said hydrophilic polymer is polyethylene glycol.

14. A porous polyimide including a plurality of micropores with a pore diameter of 1 to 700 nm made according to the method of claim 4.

15. A porous polyimide including a plurality of micropores with a pore diameter of 1 to 700 nm made according to the method of claim 5.

16. A porous polyimide including a plurality of micropores with a pore diameter of 1 to 700 nm made according to the method of claim 6.

17. A porous polyimide including a plurality of micropores with a pore diameter of 1 to 700 nm made according to the method of claim 8.

18. A porous polyimide including a plurality of micropores with a pore diameter of 1 to 700 nm made according to the method of claim 9.

19. A porous polyimide including a plurality of micropores with a pore diameter of 1 to 700 nm made according to the method of claim 11.

20. A porous polyimide including a plurality of micropores with a pore diameter of 1 to 700 nm made according to the method of claim 13.

* * * * *

UNITED STATES PATENT AND TRADEMARK OFFICE
CERTIFICATE OF CORRECTION

PATENT NO.    : 6,426,372 B1
DATED         : July 30, 2002
INVENTOR(S)   : Minami, Kazuhiko It is certified that error appears in the above-identified patent and that said Letters Patent is hereby corrected as shown below:

Column 1,
Line 13, "(Ulira" should be -- (Ultra --
Line 50, "acrogels" should be -- aerogels --

Column 2,
Line 63, "THE PROBLEM:" should be -- THE PROBLEM --

Column 6,
Line 26, "phenylencdiamine" should be -- phenylenediamine --
Line 30, "dissolving" should be -- dissolve --

Column 7,
Line 1, "alycol" should be -- glycol --

Column 8,
Line 12, "diameter Λ to 700" should be -- diameter 1 to 700 --

Column 10,
Line 13, "polyimidc" should be -- polyimide --

Signed and Sealed this

Sixth Day of July, 2004

JON W. DUDAS
*Acting Director of the United States Patent and Trademark Office*